United States Patent [19]

Sauer

[11] 4,087,669
[45] May 2, 1978

[54] HOUSED ELECTRICAL SWITCH WITH SLIDE FASTENING MEMBERS

[75] Inventor: Heinrich Sauer, Amberg, Germany

[73] Assignee: Siemens Aktiengesellschaft, Berlin & Munich, Germany

[21] Appl. No.: 661,425

[22] Filed: Feb. 26, 1976

[30] Foreign Application Priority Data

Mar. 5, 1975 Germany .............................. 2509566

[51] Int. Cl.² ............................................ H01H 13/00
[52] U.S. Cl. ................................... 200/340; 200/293; 200/295; 292/127
[58] Field of Search .................. 292/127, 124, 83, 86; 200/340, 293, 295

[56] References Cited

U.S. PATENT DOCUMENTS

| 229,995 | 7/1880 | Freeman | 292/127 |
| 1,454,118 | 5/1923 | Karsack | 292/83 |

*Primary Examiner*—E. A. Goldberg
*Attorney, Agent, or Firm*—Kenyon & Kenyon, Reilly, Carr & Chapin

[57] ABSTRACT

An electric master switch including an actuating member which is fastened to a mounting wall and is coupled to a housing containing the switching elements of the switch by means of resilient locking arms disposed in engagement with the actuating member. Wedge-shaped slide members are disposed between the locking arms and the housing for disengaging the locking arms from the actuating member.

8 Claims, 5 Drawing Figures

HOUSED ELECTRICAL SWITCH WITH SLIDE FASTENING MEMBERS

BACKGROUND OF THE INVENTION

1. Field of the Invention

This invention relates generally to electric master switches, specifically pushbutton switches in switching installations, and in particular to an improved means for fastening the housing of such a switch to an actuating member.

2. Description of the Prior Art

Pushbutton electric master switches are generally known in the art. In one known switch, described in German Auslegeschrift 2,013,779, an actuating member which can be attached to a mounting wall is fastened to a switch housing containing the switching elements of the switch by means of an H-shaped connecting element having leg members provided with detent elements. The detent elements snap into corresponding recesses or shoulders of the actuating member and the switch housing and mechanically fasten the housing and the actuating member together. Although the switching element housing can be connected to the actuating member from the rear side of the mounting wall of the switch by snapping the housing onto the actuating member while interposing the H-shaped connecting element therebetween, removing the housing from the actuating member is considerably difficult. In order to separate the switching element housing from the actuating member from the rear of the mounting wall of the switch, it is necessary to provide an additional connecting element in order to lift the snap arms of the H-shaped connecting element disposed on the rear side of the switching element housing off the housing. This is not a satisfactory solution, however, since unless the two opposite locking arms are snapped off the housing simultaneously the first locking arm may snap in again while the second locking arm is being snapped out.

SUMMARY OF THE INVENTION

It is therefore an object of the present invention to overcome the aforementioned disadvantages of heretofore known fasteners for the housings of electric master switches and to provide an improved fastening means between the actuating member and the switching element housing which can be loosened from the rear of the mounting wall of the switch in a simple and reliable manner without great effort while the actuating member is fastened to the housing.

These and other objects are achieved by the present invention in an electric master switch including an actuating member fastened to a mounting wall and coupled to a housing containing the switching elements for the switch by means of resilient locking arms disposed in engagement with the actuating member. More specifically, the improvement of the invention comprises wedge-shaped slide members disposed between the locking arms and the housing of the switch and mounted in the housing so as to be slidable between the locking arms and the housing for disengaging the locking arms from the actuating member.

In order to eliminate the need for returning the wedge-shaped slide members to their original position before the switch housing is again fastened to the actuating member, means may be provided for matching the frictional forces between the slide members and the locking arms in such a manner that the slide members are returned to their original position when the housing is placed on the actuating member of the switch. It is also desirable to provide motion-limiting stop members for the locking arms of the switch at the actuating member to prevent the slide members from slipping out from between the locking arms and the actuating member and to prevent damage to the locking arms when the latter are decoupled from the actuating member. The detent catch of the locking arms are preferably arranged laterally with respect to each locking arm and the slide members are preferably guided laterally of the locking arms, so that satisfactory operation of the slide members is achieved without the need for providing additional space. Moreover, such an arrangement permits the motion-limiting stop members to cooperate with a set-back outer edge of each locking arm with minimal space requirements.

The need for separate means for guiding the slide members in the locking arms can be eliminated if the slide members are provided with a U-shaped guide member which partially surrounds the locking arm. Since the point of connecting engagement between the locking arms and the actuating member of the switch is located at the point of disconnection between the actuating member and the switch housing, and since the slide members need not be moved to the end of the switching element housing, it is preferable to provide the slide members with a notch at the base thereof for inserting the bit of a tool, for example, a screwdriver.

These and other novel features of the invention will be described in greater detail in the following detailed description.

BRIEF DESCRIPTION OF THE DRAWINGS

In the drawings, wherein similar reference numerals denote similar elements throughout the several views thereof.

DETAILED DESCRIPTION

Figure 2:
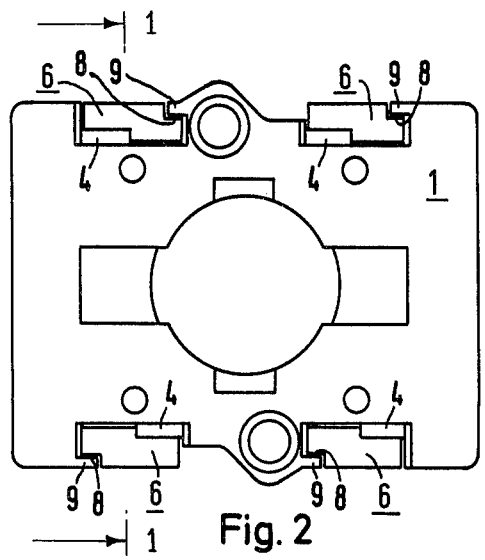
FIG. 2 is a botton plan view of an electric master switch constructed according to the invention.
Figure 4:
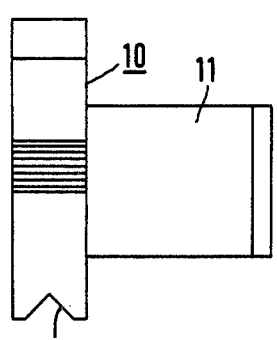
FIG. 4 is a front view of a slide member of an electric master switch constructed according to the invention.
Figure 3:
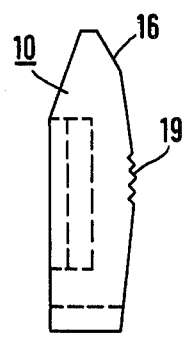
FIG. 3 is a side view of a slide member of an electric master switch constructed according to the invention.

Referring now to the drawings, there is schematically illustrated an actuating member 1 which extends in the customary manner through a cut-out 2 provided in a mounting wall 3 of an electric master switch and is fastened to the mounting wall 3. Detent projections 4 are provided on the actuating member 1 and cooperate with detent catches 5 provided on locking arms 6. The locking arms are preferably designed as part of housing 7, which contains the switching elements (not shown) of the master switch, and are located on opposite sides of the housing. Detent catches 5 extend only over part of the width of the locking arms and are fitted substantially to the width of detent projections 4 on actuating member 1 as shown in FIG. 2. Each of locking arms 6 are provided with a set-back, outer edge 8 which cooperates with a plurality of motion-limiting stop members 9 provided on actuating member 1 so that the locking arms cannot be pushed outwardly an arbitrarily far distance. A plurality of slide members 10 are provided in the switch for pushing the locking arms outwardly, i.e., for disengaging the detent of the housing with the actuating member. Each of the slide members 10 has a U-shaped pilot extension 11 and extends with the extension around the lower portion 12 of locking arms 6. As a result, the slide members 10 may be moved laterally along the side of the locking arms which face away from the actuating member, and in the side of the locking arms facing towards the actuating member 1, the former protrudes in width beyond the slide members 10 of its locking arm 6 and can, thus, be brought into engagement with the same.

Figure 1:
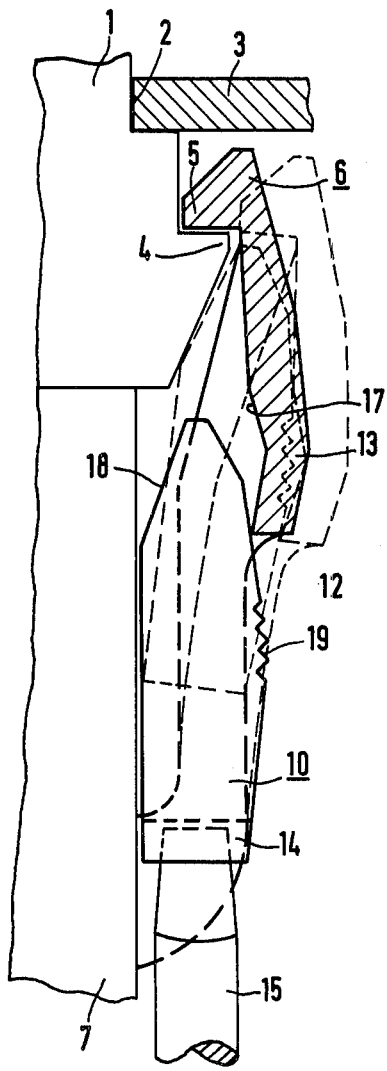
FIG. 1 is a partial, cross-sectional side view of an electric master switch including an improved fastening means constructed according to the invention.
Figure 5:
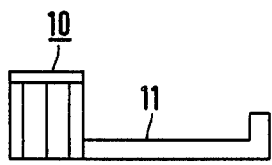
FIG. 5 is a top, plan view of a slide member of an electric master switch constructed according to the invention.

In the embodiment of the invention illustrated in FIG. 1, the slide member 10 is positioned above the lower portion 12 of the locking arms 6 and is provided with a notch 14 into which the bit of a tool, such as a screwdriver 15 can be inserted so that the slide member can be pushed in a direction towards the actuating member 1. The slide member 10 is provided with inclined surfaces 16 which engage correspondingly shaped inclines 17 on the locking arms 6. The slide member is also provided with bevels 18 which engage the detent projections 4. The latter engagement of the bevels and projections is accomplished by pushing the slide member 10 into the position illustrated by the dashed lines in FIG. 1, in which position of the slide member the locking arms 6 are moved into the position also indicated by the dashed lines. The detent catch 5 is then moved outwardly away from the projection 4 and the housing 7 can be removed from the actuating member 1 (provided, of course, that the slide member 10 on the other side of the housing has also been moved to the same position indicated by the dashed lines). In order to obtain a good frictional coupling at the inclines 17 of the locking arms 6, surfaces 16 may be provided with a plurality of serrations 19. This assures that slide members 10 remain in their depressed, i.e., engaged, position with locking arms 6. Since housing 7 will easily swing sideways to the side of the housing which is still fastened to the actuating member when the coupling between the projection 4 and the detent catch 5 is unfastened, the slide member 10 is moved to a position which permits it to be returned automatically to its original position (illustrated by the solid lines in FIG. 1) upon the placing of the housing 7 on the actuating member 1. This movement provides a detent between the housing 7 and the actuating member 1 and is achieved by means of the frictional hold of the bevels 18 at the inclined surface of the projections 4.

The fastening means of the invention permits the actuating member and the housing of the switch to be separated in poorly accessible areas without providing additional space for permitting the insertion of a tool or the like. The housings for the switching elements of the switch can be arranged close together; thus, in the embodiment of the invention illustrated in FIG. 2, two switching elements can be arranged side by side. If, as illustrated, motion-limiting stops are provided, no damage can occur to the electrical equipment.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In an electric master switch including an actuating member (1) fastened to a mounting wall (3), said actuating member (1) being coupled to a housing (7) containing the switching elements of said switch by means of resilient locking arms (6) disposed in engagement with said actuating member (1), the improvement comprising wedge-shaped slide members (10) slidably disposed between said locking arms (6) and said housing (7) for disengaging said locking arms (6) from said actuating member (1), said slide members being provided with means for matching the frictional forces between said slide members (10) and said locking arms (6), and said slide members (10) and said actuating member (1), respectively, and for returning said slide members (10) to a disengaged position with respect to said locking arms (6) when said housing is disposed on said actuating member (1).

2. The improvement recited in claim 1, wherein said actuating member (1) includes a plurality of stop members (9) for limiting the movement of said locking arms (6) in a direction away from said actuating member (1).

3. The improvement recited in claim 1, wherein said slide members (10) each include a U-shaped pilot extension member (11) which extends partially around each of said locking arms (6).

4. The improvement recited in claim 1, wherein said locking arms (6) each include a detent catch (5) disposed laterally with respect to said locking arms (6) and wherein said slide members (10) are each guided laterally of one of said locking arms (6).

5. The improvement recited in claim 2, wherein said locking arms (6) each include a setback, outer edge (8) which cooperates with one of said stop members (9) of said actuating member (1) for limiting the movement of said locking arms (6).

6. The improvement recited in claim 1, wherein said slide members (10) each include a notch (14) at one end thereof for receiving the bit of a tool for moving said slide members (10) in a direction towards said actuating member (1).

7. The improvement recited in claim 1, wherein said means for matching frictional forces comprises a plurality of serrations (19) disposed on one surface of each of said slide members (10) and a bevel (18) at one end of the opposite surface of each of said slide members (10).

8. The improvement recited in claim 7, wherein said plurality of serrations (19) are disposed on the surfaces of said slide members (10) which face said locking arms (6).

* * * * *